May 12, 1970 R. L. MARTIN 3,511,519
VEHICLE SAFETY MECHANISM
Filed Aug. 25, 1967

INVENTOR.
ROBERT L. MARTIN
BY
Yount, Raney, Flynn and Tarolli
ATTORNEYS

United States Patent Office 3,511,519
Patented May 12, 1970

1

3,511,519
VEHICLE SAFETY MECHANISM
Robert L. Martin, Detroit, Mich., assignor to Eaton Yale
 & Towne, Inc., Cleveland, Ohio, a corporation of
 Ohio
Filed Aug. 25, 1967, Ser. No. 663,323
Int. Cl. B60r 21/00
U.S. Cl. 280—150          2 Claims

ABSTRACT OF THE DISCLOSURE

A safety mechanism is adapted to be attached to a vehicle for protecting an occupant of the vehicle during a collision. The mechanism includes an expansible confinement and means in communication with the confinement for directing a fluid flow into the confinement in response to the vehicle experiencing a collision condition. The confinement has at least a portion including continuously open or non-closing exhaust means for continuously allowing fluid to be exhausted therefrom as the confinement is expanded by the fluid flow and for enabling the confinement to be contracted to dissipate the energy resulting from movement of an occupant against the confinement whereby rebound of such an occupant is minimized.

---

A large amount of talent and capital has recently been expended in the research and development of various safety devices for vehicles and particularly automobiles. Much of this effort has been expended in an attempt to protect the occupant of a vehicle from being forcefully thrown against interior components of the vehicle, such as the instrument panel and/or windshield.

One of the prior art assemblies which has been developed for solving this problem includes an inflatable confinement which is normally stored in the vehicle in a collapsed folded position and is inflated at the proper time for preventing an occupant from colliding with the interior components of the vehicle. Normally, the inflation of the confinement is accomplished automatically in response to a predetermined operating condition of the vehicle as determined by an appropriate sensing device.

In assemblies of the afore-mentioned type, the confinement is substantially inflated in the period of time between the beginning of the crash of the vehicle and the time at which the occupant of the vehicle begins to move forward as a result of the crash, a period of time which is measured in milliseconds. The confinement is, therefore, inflated, and the occupant of the vehicle engages the confinement and the confinement prevents the occupant from colliding with or impacting against interior components of the vehicle.

One of the problems associated with known assemblies is the so-called rebound of the occupant. In other words, the occupant moves into the confinement as a result of the crash and the confinement decelerates the occupant and finally stops the forward movement of the occupant; however, the confinement and the pressurized fluid therein absorbs the energy resulting from the forward movement of the occupant and after the occupant's forward movement has been stopped, the confinement throws the occupant in the opposite direction. This movement of the occupant in the opposite direction is termed rebound and is very dangerous. For example, as a result of such rebound, the occupant may suffer whiplash injuries and/or other serious injuries. The prior art assemblies have utilized various devices in an attempt to solve this rebound problem.

It is an object and feature of this invention to provide such a mechanism including an expansible confinement with improved and/or alternative means for exhausting

2 fluid from the confinement to dissipate the energy resulting from the movement of an occupant against the confinement whereby rebound of the occupant is eliminated or minimized.

Another object and feature of the present invention is to provide a safety mechanism in combination with a vehicle and including an expansible confinement and means for directing fluid into the confinement in response to a predetermined condition of the vehicle, and wherein the confinement includes at least a portion having non-closing exhaust means for continually allowing fluid to be exhausted therefrom as the confinement is being expanded and providing for contraction of the confinement to dissipate the energy resulting from movement of the occupant against the confinement whereby rebound of such an occupant is minimized.

In general, these and other objects and features of this invention may be attained in a preferred embodiment of a safety mechanism which its adapted to be attached to a vehicle for protecting an occupant thereof. The assembly includes an expansible confinement and a fluid reservoir in communication with the confinement for expanding the confinement with fluid in response to a predetermined operating condition of the vehicle. As alluded to above, various means may be utilized for expanding the confinement, such means normally including a pressure source and sensing means for allowing fluid to flow from the pressure source to the confinement in response to a predetermined operating condition of the vehicle. An example of such a pressure source and sensing means is disclosed in the above-mentioned copending application Ser. No. 562,289, now Pat. No. 3,414,292. The expansible confinement of the instant invention includes at least a portion having non-closing exhaust means for continually allowing fluid to be exhausted therefrom. More specifically, the confinement includes a portion having continually open passages therethrough. Such a portion of the confinement may comprise a porous material with the porosity thereof defining the passages therethrough. The number and the size of portions or areas of the confinement which have such passages therethrough may be varied in accordance with the anticipated amount of energy which must be dissipated as a result of the movement of the occupant into the confinement. In other words, the confinement may include a plurality of portions having continually open passages and a plurality of portions which have no such passages.

Other objects and attendant advantages of the present invention will be readily appreciated as the same becomes better understood by reference to the following detailed description when considered in connection with the accompanying drawing wherein.

Figure 1:
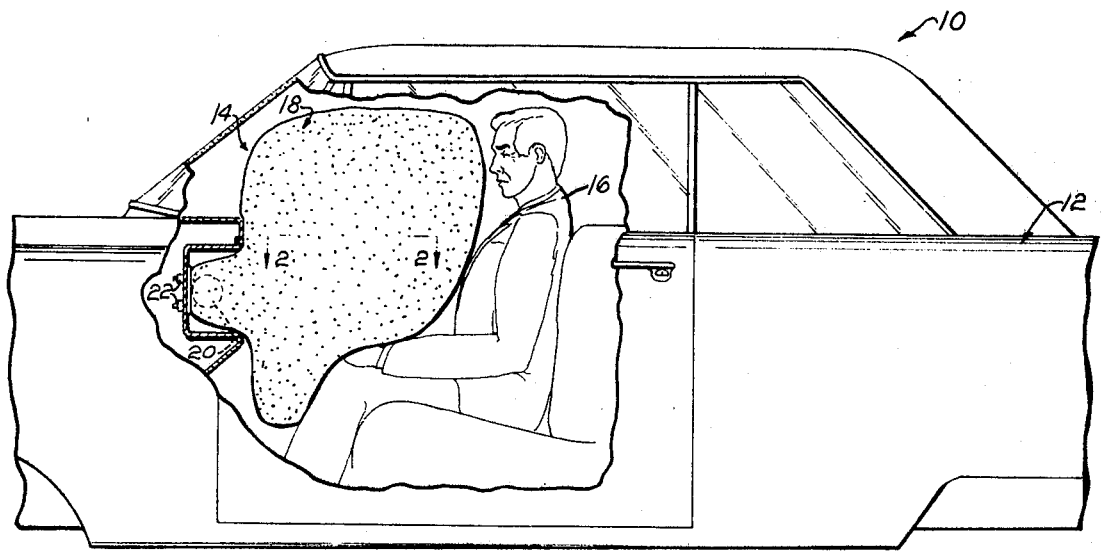
FIG. 1 is a partially broken away fragmentary view of a preferred embodiment of the instant invention with the confinement thereof shown expanded.

Referring now to the drawing, wherein like numerals indicate like or corresponding parts throughout the several views, there is shown a vehicle 10 having a body 12 and a safety mechanism 14 associated with the vehicle 10 for protecting an occupant 16 thereof.

More specifically, the mechanism 14 includes an expansible confinement 18 and a fluid reservoir 20. The expansible confinement 18 is in the form of an inflatable container or bag with non-rigid walls. The fluid reservoir 20 is in communication with the confinement 18 for inflating the confinement 18 with fluid in response to a predetermined condition. As alluded to above, various inflating means may be utilized, an example of which is disclosed in the afore-mentioned application Ser. No. 562,289, now Pat. No. 3,414,292. More specifically, that application discloses an elongate pressure container which is opened in response to the detonation of an explosive charge, the explosive charge being detonated by collision sensing means which supplies a signal to the explosive charge as a result of a predetermined operating condition of the vehicle, such as initial stages of a crash.

As illustrated in FIG. 1, the mechanism 14 is carried by the body 12 of the vehicle 10 by volts 22. During the normal operation of the vehicle 10, the confinement 18 is folded into a compact mass. In the event of a crash, accident, or the like, an appropriate sensing means allows fluid under pressure to inflate the confinement 18.

Figure 2:
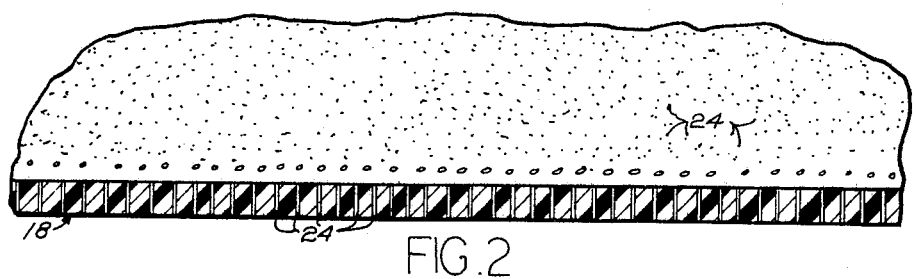
FIG. 2 is an enlarged fragmentary cross-sectional view taken substantially along line 2—2 of FIG. 1.

At least a portion of the confinement 18 includes continually open or non-closing exhaust means for continuously allowing fluid to be exhausted therefrom as the confinement 18 is being inflated and to deflate the confinement 18 to dissipate the energy resulting from movement of the occupant 16 against the inflated confinement 18 whereby rebound of the occupant 16 is minimized. More specifically, the exhaust means is defined by a portion of the confinement 18 having at least one continually open passage 24 therethrough for exhausting fluid from the confinement 18. This is best illustrated in FIG. 2 where a plurality of the passages 24 are shown. It will be understood that the size of the passages 24 may be increased with a proportionate decrease in the number of such passages. In addition, the confinement may include a plurality of the portions which include the passages 24 with the remaining portions having no such passages. In some cases, the entire confinement 18 may include such passages. The passages 24 are unobstructed and are continually open. Thus, fluid may pass through the confinement 18 as soon as the confinement 18 begins to be inflated. Due to the time factor involved for inflating the confinement 18 and the subsequent forward movement of the occupant 16, a sufficiently high fluid pressure may be utilized to inflate the confinement 18 so that the continually open passages 24 are a means for automatically dissipating the energy resulting from the movement of the occupant 16 against the inflated confinement to minimize rebound of the occupant; thus, providing a system with significantly less complexity than prior systems.

Figure 3:
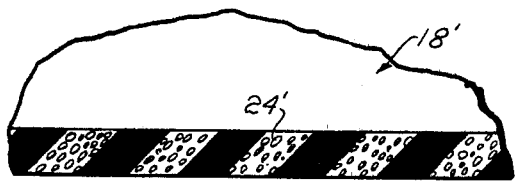
FIG. 3 is an enlarged fragmentary view similar to FIG. 2 but showing a modification.

An alternative embodiment of the confinement is shown at 18' in FIG. 3. The confinement 18' also includes a portion having continually open passages 24'. The confinement 18' has a portion as illustrated which is made of porous material and the porosity thereof defines the continually open passages 24'. Thus, since the confinement 18' is porous, it includes the passages 24' which continually allow fluid to pass therethrough as the confinement 18' is being inflated and to deflate the confinement 18' to dissipate the energy resulting from the movement of the occupant 16 against the confinement 18' to minimize rebound. The degree of porosity of the confinement 18' controls to some extent the pressure in the confinement, since a highly porous confinement will exhaust fluid more rapidly than a less porous confinement.

Again, the confinement 18' may be entirely made of a material having such passages therethrough or, alternatively, only portions of the confinement 18' may include the continually open passages 24' therethrough. The area of the confinement 18 and 18' which has the continually open passages therein will be a function of various factors, such as confinement size, rate of inflation, the pressure of the fluid used for inflating the confinement, etc. In any case, at least a portion of the confinement 18 or 18' includes non-closing exhaust means for continually allowing fluid to be exhausted from the confinement as the confinement is being inflated and to deflate the confinement to dissipate the energy resulting from movement of an occupant against the inflated confinement whereby rebound of such an occupant is minimized.

The invention has been described in an illustrative manner and it is to be understood that the terminology which has been used is intended to be in the nature of words of description rather than of limitation.

Obviously, many modifications and variations of the present invention are possible in light of the above teachings.

Having described my invention, I claim:

1. A safety device adapted to be attached to a vehicle for protecting an occupant thereof during an accident, said safety device comprising a confinement expandable by fluid flow thereinto, said confinement having a collapsed condition and an expanded operative condition for restraining movement of the occupant relative to the vehicle as a result of the accident, said confinement having at least a portion thereof made of a porous material providing fluid exhaust openings for continuously allowing fluid to be exhausted therefrom as said confinement is being expanded and to at least in part dissipate energy resulting from movement of the occupant against the expanded confinement whereby rebound of the occupant from the confinement is minimized, said porous portion of said confinement being disposed to be engaged by the occupant and the occupant's engagement therewith blocks flow of fluid from said confinement through certain ones of said exhaust openings.

2. A safety device as defined in claim 1 wherein said entire confinement is made of a porous material for allowing fluid to be exhausted continuously therefrom.

References Cited

FOREIGN PATENTS 953,312   3/1964   Great Britain.

KENNETH H. BETTS, Primary Examiner